United States Patent

[11] 3,601,560

[72] Inventors Jim C. Garrett;
Robert H. Johnson; Jack Shelton, all of
3300 E. Spring St., Long Beach, Calif.
90806
[21] Appl. No. 850,079
[22] Filed Aug. 14, 1969
[45] Patented Aug. 24, 1971

[54] DEVICE FOR BUSYING A TELEPHONE SWITCH
5 Claims, 4 Drawing Figs.

[52] U.S. Cl. .......... 179/175, 179/175.2 C, 179/18 AB
[51] Int. Cl. .......... H04m 3/22
[50] Field of Search .......... 179/175.2 C, 175.2 R, 175, 18 AB

[56] References Cited
UNITED STATES PATENTS
3,247,325 4/1966 Han et al. .......... 179/175.2
3,430,000 2/1969 Rohrig .......... 179/18

*Primary Examiner*—Kathleen H. Claffy
*Assistant Examiner*—Douglas W. Olms
*Attorney*—Hyman Jackman

ABSTRACT: A completely automatic and self-powered device provided with solid-state components allowing high input impedance on busy circuits obviating interference with dial pulses or audio during conversation on a telephone line, having a built-in time-delay and steering circuit to allow proper switch train release regardless which party on the line hangs up first, with indication of a completed operation by means of a low current lamp and internal divider, once operated, providing a ground to the telephone switch (usually a Strowger switch) to busy it out to all accessing switches until removed, and providing automatic resets when removed from the telephone jack.

INVENTORS
JIM C. GARRETT
ROBERT H. JOHNSON
JACK SHELTON
BY
Hyman Jackman
ATTORNEY

DEVICE FOR BUSYING A TELEPHONE SWITCH

BACKGROUND OF THE INVENTION

1. Field of the Invention

In telephone central offices, in most existing "step" equipment and repeaters to outgoing offices for reserving telephone equipment upon termination of a phone call, so the line circuit may be serviced while it is thus busied.

2. Description of the Prior Art

Telephone line-busying devices are known, some requiring an external power source and the lines or wires needed for connecting thereto; some have the distinct disadvantage of causing an "A" relay seizure and/or are strictly dependent on the sequence at which the parties on a line hang up; while others cause transmission loss on the talking circuits.

SUMMARY OF THE INVENTION

The act of busying a switch in a telephone line is usually accomplished by placing a ground on the sleeve lead thereof. This serves to prevent the switch from being selected in a switch train. However, when a switch is in use, the sleeve cannot be grounded until the train is fully released. Also, in the act of busying out a switch, it is not desirable to seize the "A" relay since it causes a "Permanent Alarm Light" after a time interval.

The present line-busying device comprises a time-delay circuit 10 using a thermistor 11, i.e., an element comprising an electrical resistor the resistance of which varies sharply in a known manner with the temperature therearound, a steering circuit 12 employing a diode 13, a switching circuit 14 including a transistor 15 and a relay 16, and a voltage divider 19 required to provide current sufficient to light an indicator lamp 18 and yet keep the current flow through the "A" relay in the circuit low enough to prevent operation of said relay.

Objects of the invention are to provide a small, compact and easily applied means for automatically busying a telephone switch as soon as both parties have hung up; a means which will not affect dialing, conversation, or either party's release from the call; and means that will give a visual indication of the completed operation and yet not cause any relays to operate on the switch it is being used on.

This invention also has for its objects to provide such means that are positive in operation, convenient in use, easily installed in a working position and easily disconnected therefrom, economical of manufacture, relatively simple, and of general superiority and serviceability. The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

BRIEF DESCRIPTION OF THE DRAWING

In the drawing, like reference characters designate similar parts in the several views.

DESCRIPTION OF THE PREFERRED EMBODIMENT

Figures 1, 2:
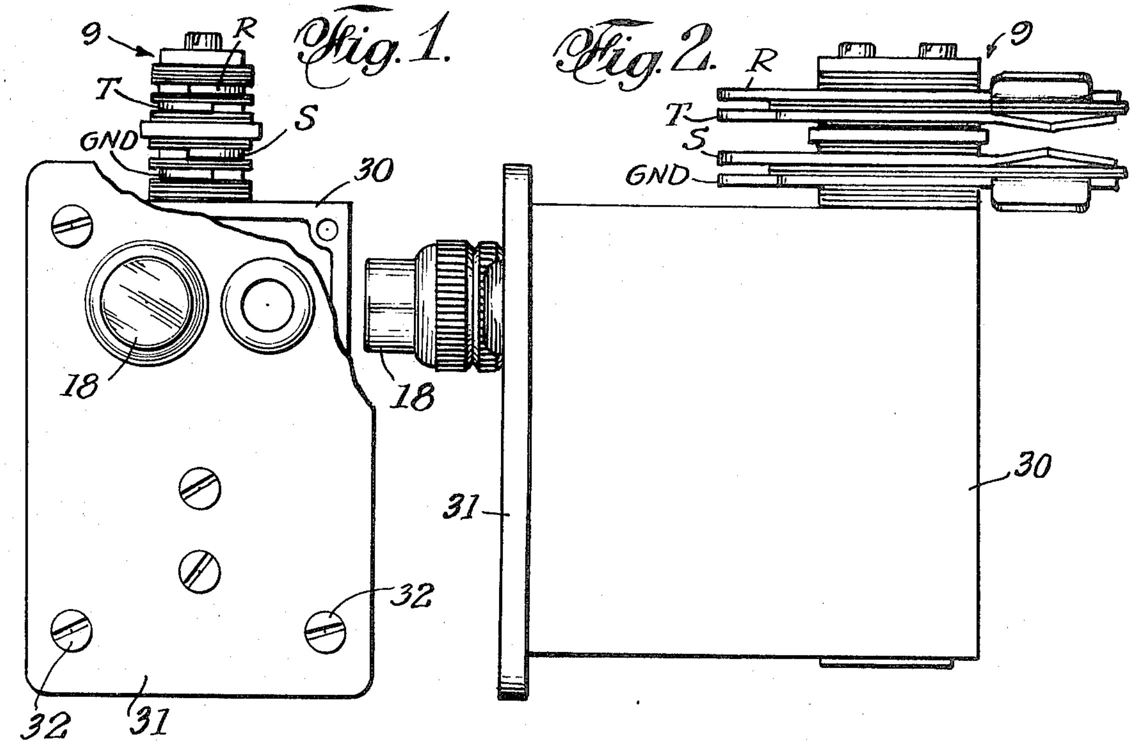
FIG. 1 is a partly broken front elevational view of the present busying device.
FIG. 2 is a side elevational view thereof.

The function of the device is to hold itself "turned off" any time the same is inserted into a switch jack with a ground on the 03 (sleeve) contact (busy condition), or a polarity reversal is present on the 02 (tip) or 01 (ring). After both parties hang up, the ground is removed from the 03 contact and the trunk restores to proper polarity. The device, which is slow to operate to allow the full switch train to release, activates, placing a ground back on the 03 contact and lighting the lamp 18, thereby indicating that the switch is busied out, so it will be bypassed.

While performing its function, the device neither causes pulse distortion on a call in progress, nor does it interfere with conversation on a call in progress. The current is so routed as to obviate a seizure of the switch into which it is plugged.

1. Busy Switch Conditions (call in progress).

When the present device is inserted in the test jack, the sleeve contact 03 being grounded, the switch contacts 5, 6 and 8, 9 being normally closed, the transistor 15 is held "off" due to the reverse bias voltage between the tip contact 02 and sleeve contact 03. The diode 13 holds the path open from contact 01 to contact 02. The thermistor is at full resistance due to the transistor being turned off, and the relay 16 remains deenergized. This condition maintains throughout the conversation taking place.

2. Idle Switch Condition (both parties hang up).

The operating path for the relay 16 is from the ring contact 01, through diode 13, and transistor 15 (turned "on" by biasing resistor 17); normally closed contacts 8 and 9; time-delay thermistor 11; and relay coil 25, to tip contact 02. The diode conducts with proper polarity; and the lamp 18 is shorted out, thereby allowing uniform warmup of the thermistor 11. The resistance of the thermistor decreases as heat is generated therein, providing a time delay in the circuit to the relay coil 25.

3. Busied Switch Condition (device activated).

The activated relay 16 connects the ground contact 04 through operated contacts 6, 7 and provides a second path for current to the lamp 18 through operated contacts 9, 10 through resistor 19 to ground contact 04. The switch is now busied out and, therefore, bypasses calls. The resistive voltage divider provides current of a degree to light the lamp 18 to maximum brilliance without causing current flow through the "A" relay with which it is in series, sufficient to operate it.

Figure 3:
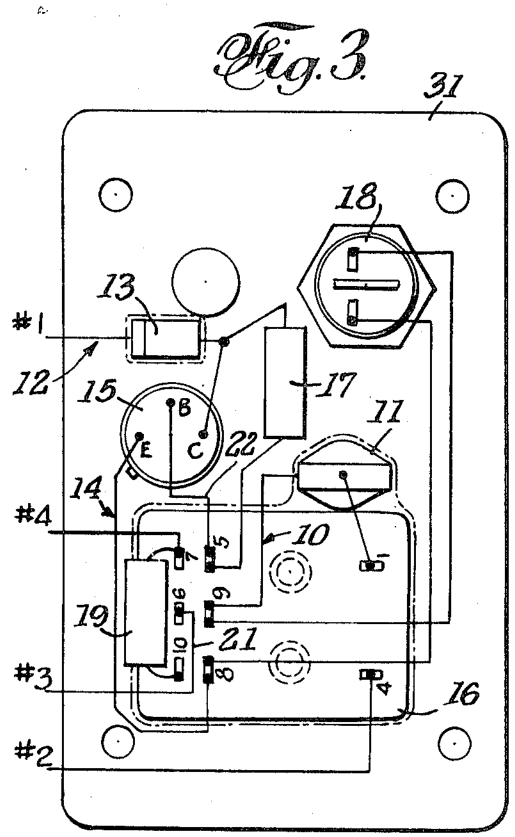
FIG. 3 is a semischematic view of the arrangement of the components and electrical connections thereof.
Figure 4:
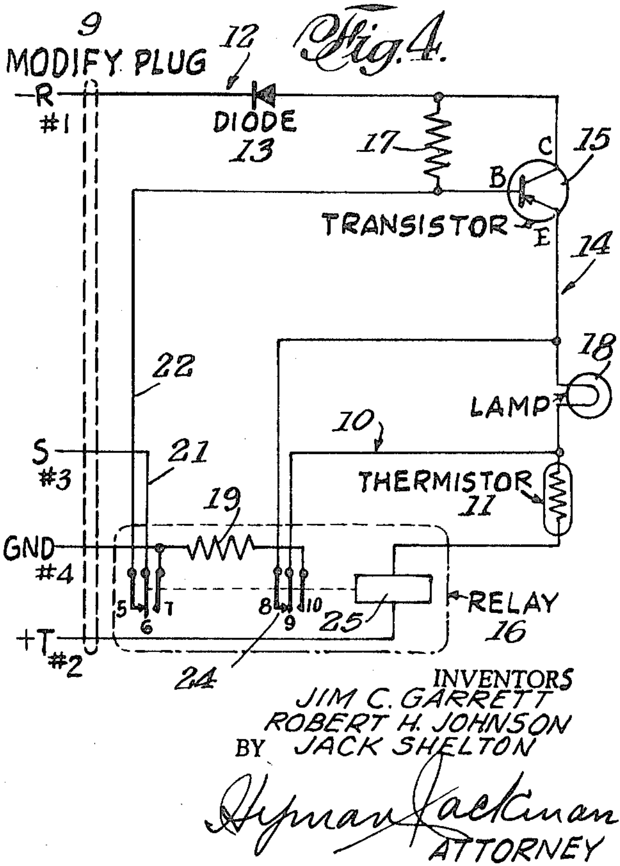
FIG. 4 is a wiring diagram of the circuits of the device.

The small size and unitary compactness of the present line-busying device is clearly illustrated in FIGS. 1, 2 and 3. A dielectric housing 30 mounts the Modify Plug, which comprises the contacts 01 (−R), 02 (+T), 03 (S) and 04 (GND), in such a manner that the overhanging ends thereof, as in FIG. 2, may be readily inserted in a test jack, the opposite ends of said contacts by suitably colored conductors, extending through a hole in the top wall of housing 30 and into the interior thereof. The remaining complement of elements of the device is mounted on a cover plate 31, as best seen in FIG. 3, and the same are connected in circuit according to said FIG. 3 and the diagram of FIG. 4. Suitable screws 32 fasten the cover plate to the housing, leaving the lamp 18 visible. Ready access to the elements mounted on the cover plate is had by simply withdrawing the latter, leaving all the connections in place and the device completely operative and capable of being tested.

While the foregoing has illustrated and described what is not contemplated to be the best mode of carrying out the invention, the construction is, of course, subject to modification without departing from the spirit and scope of the invention.

Having thus described the invention, what is claimed and desired to be secured by Letters Patent is:

1. A device for automatically busying a telephone switch in a telephone circuit that is in use so that said circuit will be bypassed by incoming calls after the same is no longer in use, comprising:

a plug comprising ring, tip, sleeve and ground jacks adapted for connection to the corresponding terminals of said switch, said sleeve jack being grounded when said telephone circuit is in use, a switching circuit between the sleeve and the tip jacks and including two sets of switch contacts of a relay, a transistor in said switching circuit held "off" by a reverse bias voltage between the tip and sleeve jacks, and a steering diode to conduct current from the ring to the tip jacks to allow the transistor to be biased "on" when the two sets of relay-switch contacts are in normal closed position connecting the switching and a time-delay circuit, said time-delay circuit including a thermistor and the coil of said relay in circuit with one of said switch contacts to control operating current to said coil according to the resistance of said thermister.

2. A device according to claim 1 including:

an indicator lamp in circuit with the transistor and the one of said relay switch contacts, and a voltage divider to provide line-operating current sufficient to light said lamp while reducing current flow in said line to render the "A" relay thereof inoperative.

3. A device according to claim 2 in which a ground is maintained on the sleeve jack during normal use of the telephone circuit by parties at both ends thereof, the steering diode holding the path between the ring and tip jack open during such use.

4. A device according to claim 3 in which, when one party hangs up, polarity of the telephone circuit is restored to normal and the ground on the sleeve jack is retained.

5. A device according to claim 4 in which, when the other party hangs up, the steering diode acts to remove the ground from the sleeve jack, and the switching circuit turns the transistor "on".